United States Patent [19]
Yamamoto et al.

[11] Patent Number: 5,343,273
[45] Date of Patent: Aug. 30, 1994

[54] FILM CARRIER FOR PHOTOGRAPHIC PRINTER

[75] Inventors: Takashi Yamamoto; Yoshio Ozawa, both of Kanagawa, Japan

[73] Assignee: Fuji Photo Film Co., Ltd., Kanagawa, Japan

[21] Appl. No.: 90,455

[22] Filed: Jul. 13, 1993

[30] Foreign Application Priority Data

Jul. 13, 1992 [JP] Japan .................................. 4-185459

[51] Int. Cl.$^5$ .............................................. G03B 27/62
[52] U.S. Cl. ...................................................... 355/75
[58] Field of Search ......................... 355/73, 74, 75, 76

[56] References Cited

U.S. PATENT DOCUMENTS 4,188,115  2/1980  Marvin ................................. 355/75

Primary Examiner—Richard A. Wintercorn
Attorney, Agent, or Firm—Sughrue, Mion, Zinn, Macpeak & Seas

[57] ABSTRACT

A film carrier has a film press plate pivotably coupled to a mask plate and openable relative to the mask plate. While sandwiching a photographic filmstrip between the film press plate and the mask plate, the mask plate is two-dimensionally slid on a base plate to position a cropping area in alignment with the center of the print light. The mask plate has a wear resistant sheet cemented to the bottom surface thereof which facilitates smooth sliding of the mask plate on the base plate. The mask plate also has three permanent magnets. After sliding, the mask plate is held onto the base plate by magnetic attraction of two of the three magnets. The third magnet is used to hold the film press plate onto the mask plate.

14 Claims, 5 Drawing Sheets

FIG. 1
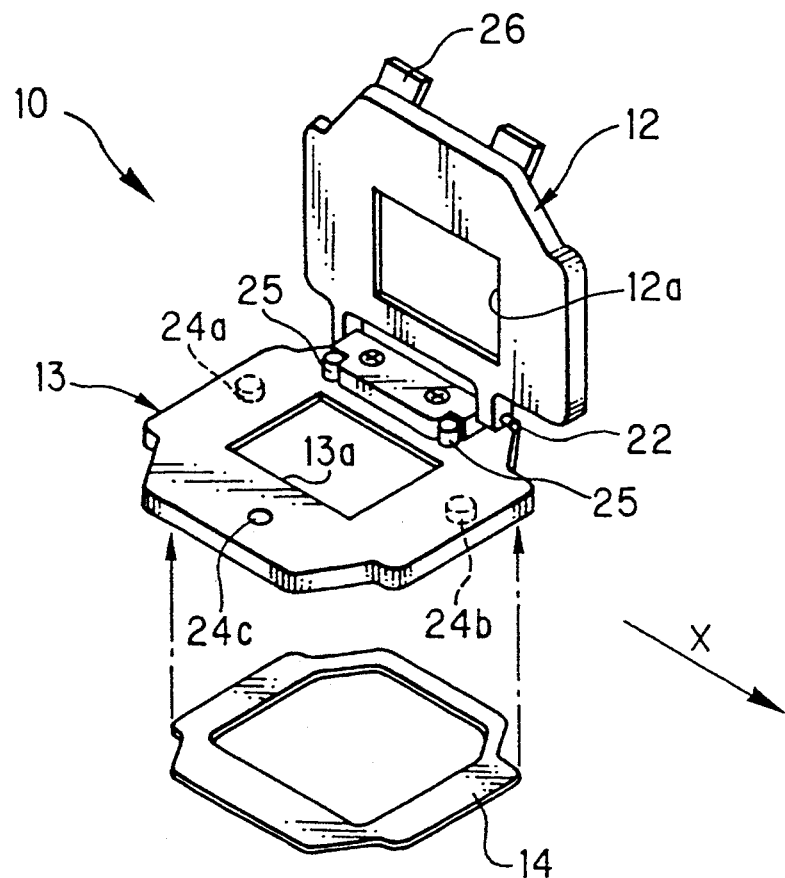
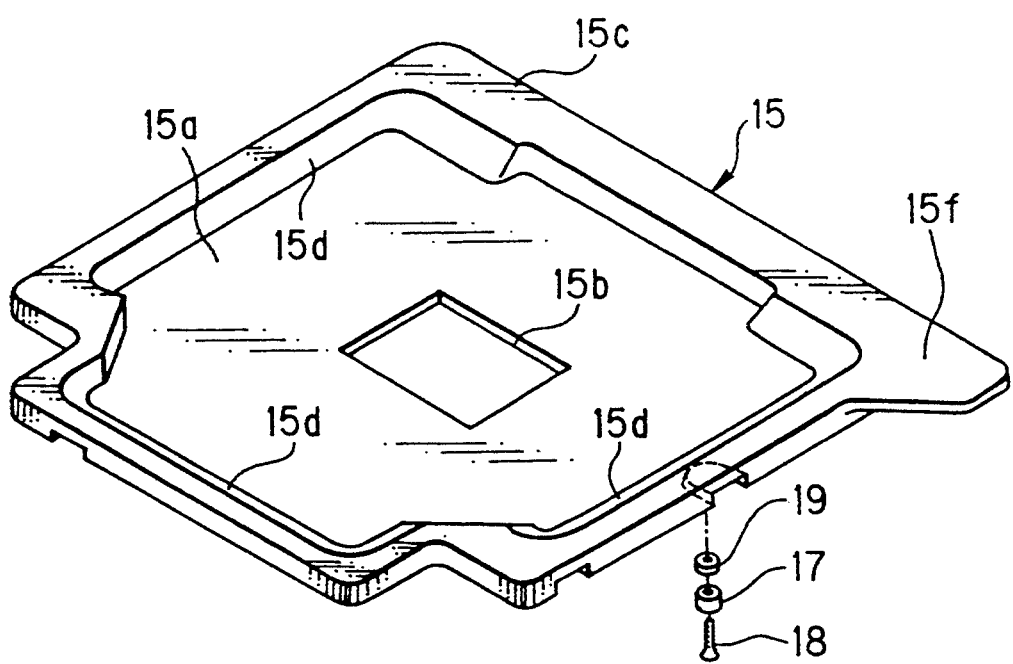

FILM CARRIER FOR PHOTOGRAPHIC PRINTER

BACKGROUND OF THE INVENTION

1. Field of the Invention

The present invention relates to a film carrier used in a photographic printer, and more particularly to a film carrier for use in cropping.

2. Description of the Related Art

When making photographic prints, a film carrier is used for holding or pressing the photographic film to flatten an image frame formed on the film and placed in a print station. The film carrier is constructed of a mask plate for holding the photographic film thereon and a film press plate for pressing the photographic film onto the mask plate. While the photographic film is transported, the film press plate is displaced away from the mask plate to prevent damage to the photosensitive emulsion layer of the photographic film. During a printing exposure, the film press plate is urged by a solenoid toward the mask plate to maintain the surface of the photographic film flat and even.

Film carriers utilized for cropping must especially provide a high degree of flatness and evenness of the photographic film because the cropping is usually performed at a higher print magnification than ordinary printing. However, the conventional pressing mechanism using solenoids or springs requires a complicated and large mechanical device. Furthermore, it is conventionally necessary, during cropping, to slide the film carrier on the base plate to bring the center of the cropping area of the image frame in alignment with the center of the printing light. However, the surface of the conventional film carrier for use in cropping is not smooth thus quickly becomes worn.

SUMMARY OF THE INVENTION

In view of the foregoing, an object of the present invention is to provide a film carrier for a photographic printer, which is simple in construction, slides smoothly on a base plate, and is wear resistant.

To achieve the above and other objects, the present invention provides a steel base plate having an opening formed therein in a print position, and a mask plate having a top surface for holding a strip of photographic film thereon and a wearing resistant finished bottom surface. When cropping, the mask plate is slid on the base plate, with the bottom surface thereof in contact with the top surface of the base plate. A film press plate is coupled to the mask plate by a coupling axle. The press plate pivots about the coupling axle between a closed position, for flatly sandwiching the photographic film between the film press plate and the mask plate, to an open position, where the film press plate is displaced away from the mask plate. The film press plate is set in the closed position during the printing, and moved to the open position during advancement of the photographic film. The mask plate is also provided with at least a permanent magnet for holding the mask plate onto the base plate as well as for holding the film press plate onto the mask plate by magnetic attraction. Accordingly, the film press plate is magnetically held on the mask plate, and the mask plate itself is also magnetically held on the base plate. This feature makes the film carrier simple in construction. Also, the wear resistant finished bottom surface of the mask plate minimizes wear of the mask plate and facilitates the smooth sliding of the mask plate on the base plate.

According to a preferred embodiment, the wear resistant finished surface of the mask plate is provided by cementing a sheet of ultra-high-molecular material to the bottom of the mask plate.

BRIEF DESCRIPTION OF THE DRAWINGS

Other objects and advantages of the present invention will become apparent in the following detailed description of the preferred embodiment when read in connection with the accompanying drawings, wherein like reference numerals designate like or corresponding parts throughout the several views, and wherein:

FIG. 1 is an exploded perspective view of a film carrier according to an embodiment of the present invention;

DETAILED DESCRIPTION OF THE PREFERRED EMBODIMENT

Figure 2:
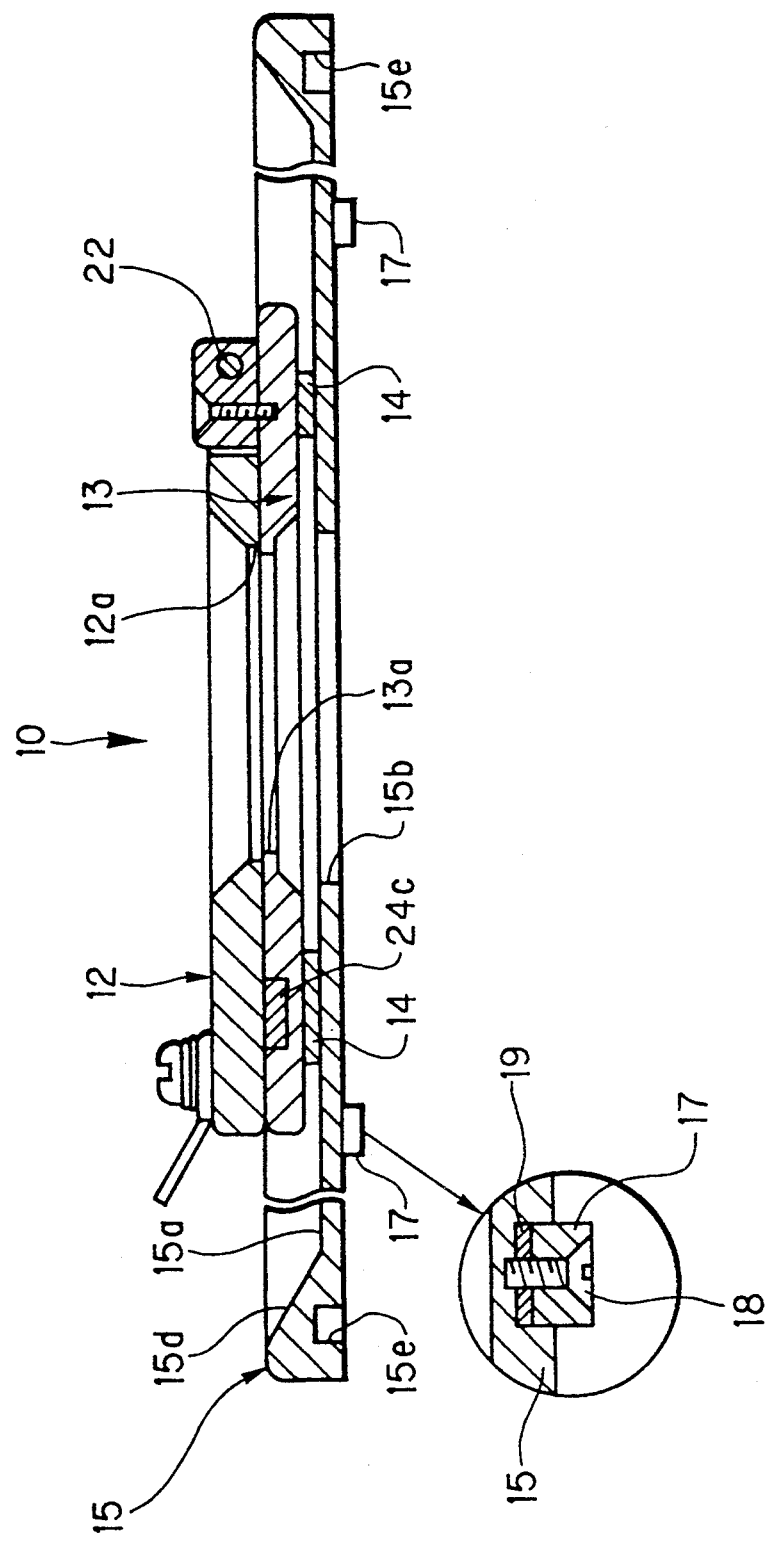
FIG. 2 is a sectional view of the film carrier taken along a direction orthogonal to a film advancing direction X as shown in FIG. 1.

As shown in FIGS. 1 and 2, a film carrier 10 is constructed of a film press plate 12, a mask plate 13 and a base plate 15 which are made of steel.

The base plate 15 has a sliding surface 15a which is recessed with respect to a top surface 15c of the base plate 15 which surrounds the sliding surface 15a. In cropping, the mask plate 13 can be slid on the sliding surface 15a to properly align the image frame for printing. The sliding surface 15a has an opening 15b formed therein which is larger than an image frame. The sliding surface 15a is connected to the surrounding top surface 15c through an inclined surface 15d which is splayed upward at 45 degrees or more.

Figure 3:
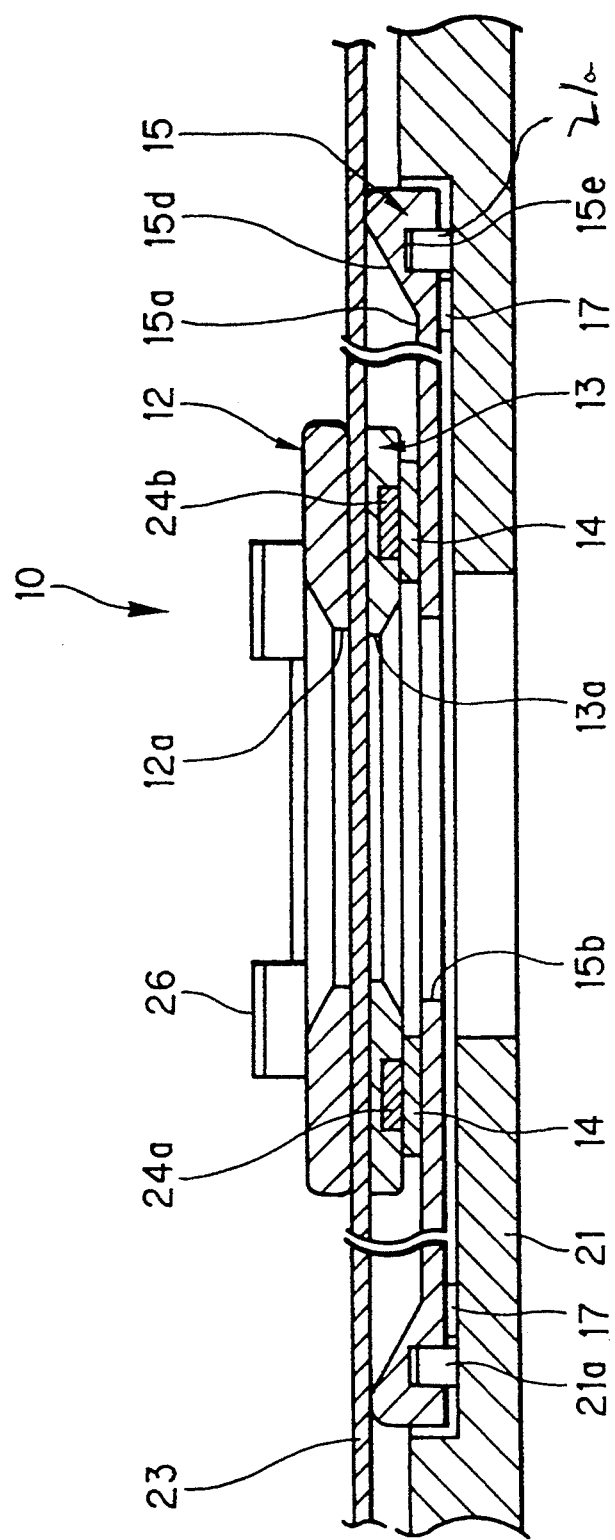
FIG. 3 is a sectional view of the film carrier holding a filmstrip and placed on a base plate, taken along the film advancing direction X.
Figure 4:
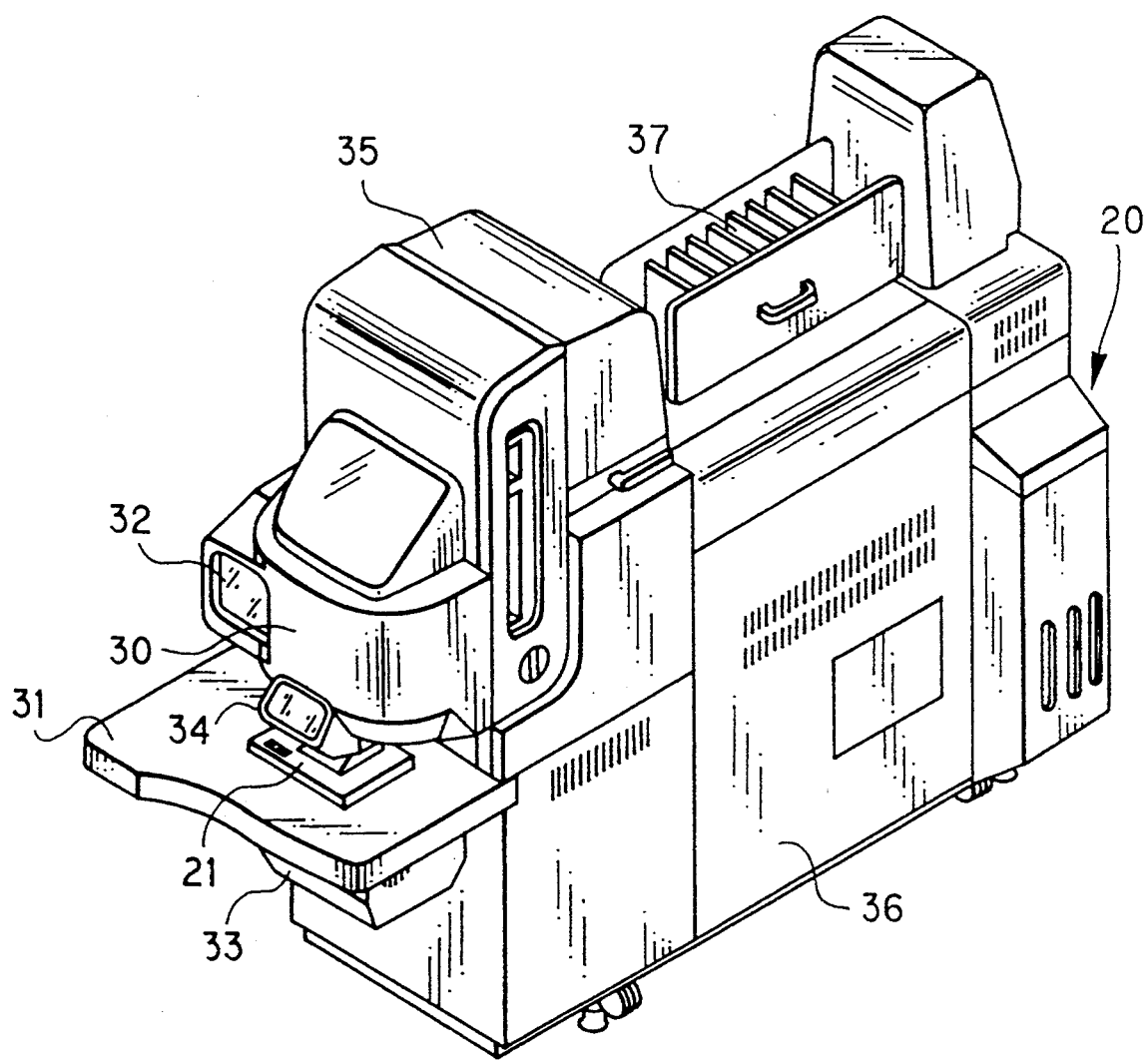
FIG. 4 is an outer appearance of a photographic printer for use with the film carrier of the preferred embodiment.

As shown in FIGS. 2 and 3, the base plate 15 further has a plurality of positioning holes 15e and legs 17 on the bottom surface thereof. The positioning holes 15e are, for example, fitted onto the pins 21a of a film carrier station 21 of a photographic printer 20 as shown in FIGS. 3 and 4, to position the center of the opening 15b in alignment with the center of the projected printing light. Each leg 17 is mounted to the base plate 15 by a screw 18 through a thin washer 19, to permit adjustment of the height of the sliding surface 15a in the direction of the optical axis of projected printing light (up and down in FIG. 2). A tab 15f is provided for placing the base plate 15 onto or removing the same from the film carrier station 21.

The film press plate 12 is mounted to the mask plate 13 by a coupling axle 22, and is pivotable between a closed position and an open position. In the closed position, the film press plate 12 is close to the mask plate 13 to sandwich a strip of photographic film 23 therebetween. In the open position, the film press plate 12 is remote from the mask plate 13 for enabling the filmstrip 23 to be moved.

The film press plate 12 and the mask plate 13 also have respective openings 12a and 13a formed respectively therein. The opening 12a is slightly larger than the image frame of the filmstrip 23. The opening 13a is disposed at a position which corresponds to the opening 12a of the film press plate 12 when the press plate 12 is in the closed position, and is slightly smaller than the image frame. The opening 13a confines the area to be printed within the image frame, and is defined by marginal edges which are formed as knife-edges, that is, thinned or tapered to splay toward a printing light source. This serves to minimize the adverse effects of reflection of light during printing.

A wear resistant sheet 14 is cemented to the bottom of the mask plate 13, for preventing wear of the mask plate 13 and allowing it to smoothly slide on the sliding surface 15a. The sheet 14 is disposed on the circumference of the opening 13a and is made of, for example, a sheet of a ultra-high-molecular polyethylene having a thickness of 0.5 mm. It is, instead, possible to coat the bottom surface of the mask plate 13 with a wear resistant material. The wear resistant material may alternatively be applied on the sliding surface 15a of the base plate 15 or to both the sliding surface 15a and the mask plate 13.

The mask plate 13 is further provided with three permanent magnets 24a and 24c and two film guide pins 25 (see FIG. 1). Two of the permanent magnets 24a and 24b are arranged along the film advancing direction X on the opposite sides of the opening 13a, and hold the mask plate 13 onto the base plate 15 by magnetic attraction. The remaining permanent magnet 24c is for holding the film press plate 12 onto the mask plate 13 when the film press plate 12 is in the closed position. The film guide pins 25 accept side edges of the filmstrip 23 in and limit the position or motion of the filmstrip 23 the direction transverse to the film advancing direction X. A pair of lugs 26 are secured to the film press plate 12 for facilitating the opening and closing of the film press plate 12.

The operation of the above-described film carrier 10 is as follows:

First, the base plate 15 is grasped by the operator at the tab 15f and placed on the film carrier station 21 disposed on an operation table 31 of the photographic printer 20. Because the photographic printer 20 has an optical system portion 30 disposed close to the operation table 31, the spacing between the optical system portion 30 and the film carrier station 21 is so close that the filmstrip 23 should be set in the mask plate 13 before the mask plate 13 is placed on the base plate 15 in the film carrier station 21.

Figure 5:
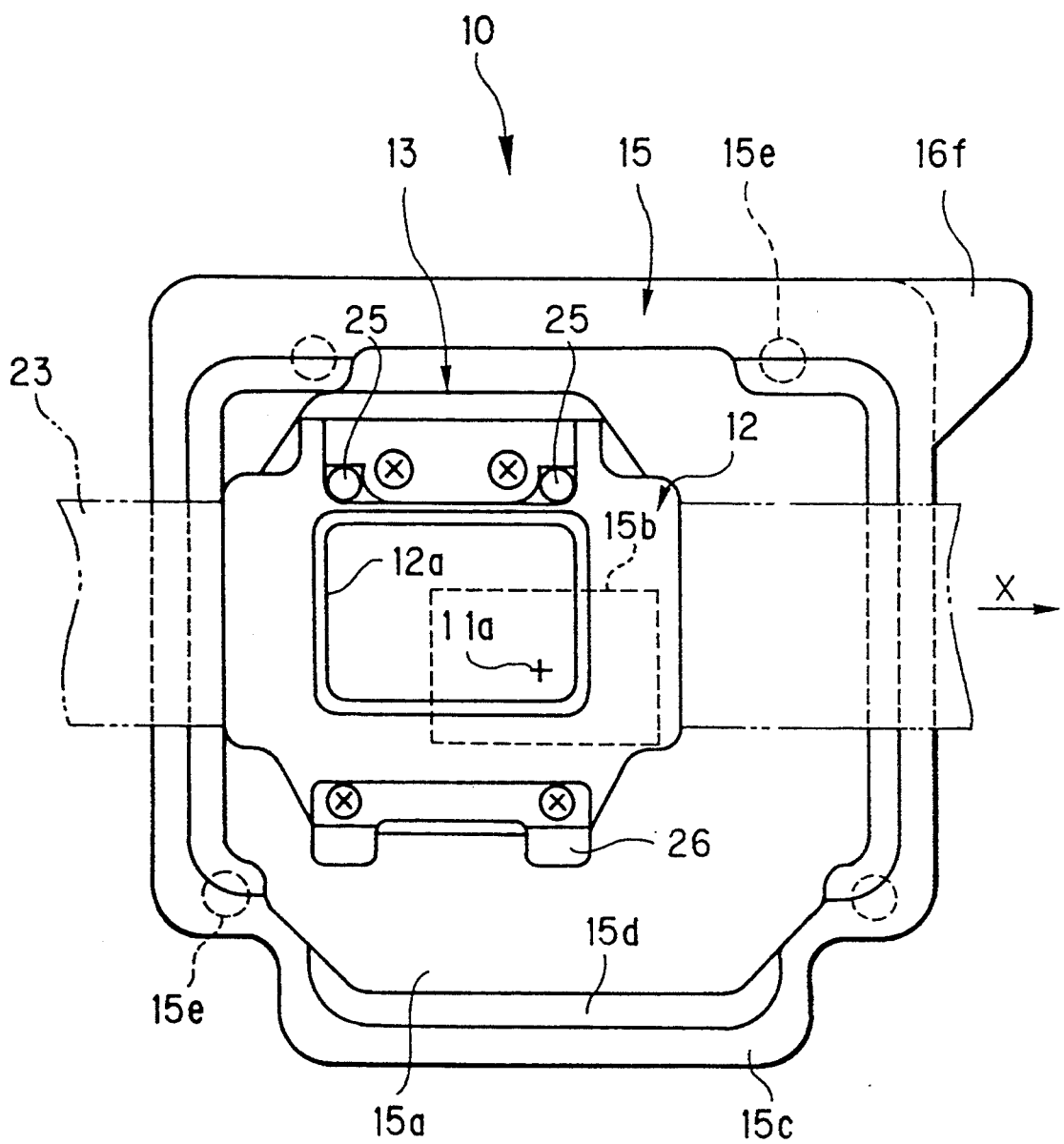
FIG. 5 is a plane view of the film carrier of FIG. 1.

When setting the filmstrip 23 in the mask plate 13, the lugs 26 are grasped by the operator to open the film press plate 12, and an image frame of the filmstrip 23 is positioned in the opening 13a of the mask plate 13. Thereafter, the film press plate 12 is closed to sandwich the filmstrip 23 between the mask plate 13 and the film press plate 12. In addition, the permanent magnet 24c holds the film press plate 12 against the mask plate 13 by magnetic attraction and thus the surface of the filmstrip 23 is supported evenly to lie in substantially a single plane. Next, the mask plate 13 holding the filmstrip 23 is placed onto the sliding surface 15a of the base plate 15. This condition is shown in FIG. 5.

The photographic printer 20 is previously inputted with data designating the size of photographic print, the area of cropping and so forth. Based on this data, the magnification of a print lens built in the optical system portion 30 is automatically adjusted, and a cropping line corresponding to the cropping area is displayed on a monitor CRT 32. Meanwhile, printing light is projected from a light source portion 33 through the openings 15b and 13a onto the image frame to be printed, so that the light passing through the image frame is received by a television camera disposed in the optical system portion 30. Thereby, a positive video image simulating a photographic print made from the image frame to be printed is displayed on the CRT 32 in combination with the cropping line.

With reference to the positive video image on the CRT 32, the mask plate 13 viewed through a look-in window 34 is slid on the sliding surface 15a to position the image area to be cropped in correspondence with the cropping line on the CRT 32. Because of the wear resistant sheet 14, this sliding operation can be carried out smoothly, and the life of the mask plate 13 is elongated. After the positioning operation, the mask plate 13 will be maintained in the proper position because the permanent magnets 24a and 24b hold the mask plate 13 onto the sliding surface 15a by magnetic attraction.

Then, the finished conditions of the photographic print are inspected and corrected with reference to the simulated image on the CRT 32, and a command for starting printing is entered through a keyboard or the like. In response to such a command, a shutter of the optical system portion 30 is actuated to expose a photographic paper to the printing light passing through the image frame and the print lens to print the cropped image into the photographic paper. The photographic paper is fed from a paper magazine portion 35 of the photographic printer 20. The exposed photographic paper is cut into an individual print frame and transported to a photofinishing portion 36 where the exposed print frame is subjected to development, fixing, washing, drying and other photofinishing processes. The finished photographic print is ejected out into a tray 37.

When making the next print from another image frame of the filmstrip 23 or another filmstrip, the mask plate 13 is removed from the base plate 15 and, thereafter, the film press plate 12 is opened to advance the filmstrip 23 or to replace the filmstrip 23. The removal of the mask plate 13 from the base plate 15 is easy even though the spacing between the optical system portion 30 and the film carrier station 21 is very narrow, because it is possible to easily slide the mask plate 13 along the inclined surface 15d continuously from the sliding surface 15a. Setting the positioning of the new image frame can be performed in the same manner as set forth above.

While the present invention has been described in detail above with reference to a preferred embodiment shown in the drawings, it will be apparent to those skilled in the art that various changes and modifications of the present invention are possible without departing from the scope of the invention as defined by the appended claims.

What is claimed is:

1. A film carrier for holding a developed photographic filmstrip so as to position an image frame in a print position of a photographic printer, said film carrier comprising:
 a steel base plate having a first opening formed therein in correspondence with said print position for allowing print light to pass therethrough;
 a mask plate having a top surface for supporting said photographic filmstrip thereon and a bottom surface, said mask plate being slidable on said base plate, with said bottom surface in contact with said base plate, so as to bring a center of an area to be printed within said image frame in alignment with a center of the print light;

a film press plate pivotably coupled to said mask plate by a coupling axle, said film press plate being pivotable about said coupling axle between a closed position, wherein said film press plate is close to said mask plate, and an open position, wherein said film press plate extends away from said mask plate, the photographic filmstrip being held flat and even between said mask plate and said film press plate when said film press plate is in said closed position, and the photographic filmstrip being moveable with respect to said mask plate at said open position; and at least one permanent magnet disposed on one of said base plate, said mask plate and said film press plate for holding said mask plate onto said base plate by magnetic attraction and for holding said film press plate onto said base plate by magnetic attraction.

2. A film carrier as recited in claim 1, further comprising:

a wear resistant finish formed on said bottom surface.

3. A film carrier as recited in claim 2, wherein a second opening is formed in said mask plate and a third opening is formed in said film press plate, said second and third openings being approximately equal in size to said image frame.

4. A film carrier as recited in claim 3, wherein said second opening is slightly smaller than said image frame and is defined by inwardly tapered edges of said mask plate for minimizing the reflection of said print light.

5. A film carrier as recited in claim 2, wherein said wear resistant finish is a sheet of wear resistant material cemented to said bottom surface of said mask plate.

6. A film carrier as recited in claim 5, wherein said sheet of wear resistant material is an ultra-high-molecular polyethylene having a thickness of 0.5 mm.

7. A film carrier as recited in claim 3, wherein said base plate has a sliding surface defined therein for sliding said mask plate thereon and an inclined surface inclined which extends upward from said sliding surface.

8. A film carrier as recited in claim 7, wherein said base plate is removable from said print position, and has positioning holes formed therein which are adapted to receive protrusions formed on the printer for positioning a center of said first opening in alignment with the center of the print light.

9. A film carrier as recited in claim 8, further comprising:

moveable legs extending from said base plate for adjusting the position of said sliding surface along a direction of the print light.

10. A film carrier as recited in claim 3, wherein said mask plate and said film press plate are made of steel.

11. A film carrier as recited in claim 10, wherein there are a plurality of said permanent magnets, two of said permanent magnets being disposed on said bottom surface of said mask plate, on opposite sides of said second opening, to hold said mask plate onto said base plate, and at least one of said permanent magnets being disposed on said top surface of said mask plate to hold said film press plate onto said mask plate.

12. A film carrier as recited in claim 3, wherein said mask plate further comprises at least a pair of guide pins which contact the photographic filmstrip for limiting the motion of said photographic filmstrip in a direction which is transverse to a direction of the print light.

13. A film carrier as recited in claim 3, wherein said film press plate further comprises at least one lug extending therefrom for facilitating the pivoting of said film press plate by allowing an operator to grasp said lug.

14. A photographic printing device comprising:

a film carrier comprising;

a steel base plate having a first opening formed therein for allowing print light to pass therethrough and positioning holes formed therein;

a mask plate having a top surface for supporting said photographic filmstrip thereon and a bottom surface, said mask plate being slidable on said base plate, with said bottom surface in contact with said base plate, so as to bring a center of an area to be printed within said image frame in alignment with a center of the print light;

a film press plate pivotably coupled to said mask plate by a coupling axle, said film press plate being pivotable about said coupling axle between a closed position, wherein said film press plate is close to said mask plate, and an open position, wherein said film press plate extends away from said mask plate, the photographic filmstrip being held flat and even between said mask plate and said film press plate when said film press plate is in said closed position, and the photographic filmstrip being moveable with respect to said mask plate at said open position; and at least one permanent magnet disposed on one of said base plate, said mask plate and said film press plate, said film press plate is for holding said mask plate onto said base plate by magnetic attraction and for holding said film press plate onto said base plate by magnetic attraction;

a film carrier station for placing said film carrier thereon, said film carrier station having positioning pins corresponding to said positioning holes of said base plate;

a light source portion disposed below said film carrier station for projecting the print light toward the image frame;

an optical system portion disposed above said film carrier station, said optical system portion including a video camera, a print lens and a shutter;

a monitor display coupled to said video camera for displaying a video image simulating a positive image of a photographic print to be made from the image frame, using an image signal generated by said video camera, and a designated cropping line in combination with said video image in accordance with cropping data; and a look-in window defined near said print position for observing said film carrier when sliding said mask plate on said base plate to place said image frame in said print position.

* * * * *